Aug. 15, 1950 J. A. MAURER, JR 2,519,194
METHOD OF AND MEANS FOR RECORDING ELECTRICAL
IMPULSES AND IMPULSE RECORD PRODUCED THEREBY
Filed June 3, 1946 3 Sheets-Sheet 1

INVENTOR:
JOHN A. MAURER, JR.
BY Otto J. Nathanson
AGENT

INVENTOR:
JOHN A. MAURER, JR.
BY Otto J. Nathansohn
AGENT

INVENTOR.
JOHN A. MAURER, JR.
BY Otto J. Nathansohn
AGENT

Patented Aug. 15, 1950

2,519,194

UNITED STATES PATENT OFFICE 2,519,194

METHOD OF AND MEANS FOR RECORDING ELECTRICAL IMPULSES AND IMPULSE RECORD PRODUCED THEREBY

John A. Maurer, Jr., New York, N. Y., assignor to J. A. Maurer, Inc., Long Island City, N. Y., a corporation of New York Application June 3, 1946, Serial No. 673,994

18 Claims. (Cl. 179—100.3)

This invention relates to the photographic recording of electrical impulses on a moving film as it is practiced, for example, in sound-on-film recording, and this application is a continuation-in-part of my application Serial No. 548,093 filed August 4, 1944 now patent No. 2,404,137, granted July 16, 1946 and also assigned to J. A. Maurer, Inc., a corporation of New York.

In sound-on-film recording, two main kinds of photographic tracks are distinguished, namely, variable area tracks and variable density tracks. Among the means devised for their production on the moving film, certain optical systems of the mirror oscillograph type lend themselves equally well to the production of both kinds of tracks. In these optical systems, one or more illuminated openings are provided in a screen and an image thereof is formed in the plane of a slit, while a mirror is mounted on an oscillograph galvanometer for vibration in accordance with the intensity of the electrical impulses to be recorded so that it, by its vibration, moves the image in relation to the slit. The invention is concerned with optical systems of the mirror oscillograph type, and considers the production of both variable area and variable density tracks therewith.

More particularly, the invention relates to the production of variable area and variable density tracks of the kind which is known in the art as "push-pull." Push-pull tracks are generally composed of two half-tracks, and they are classified in accordance with the character of their half-tracks as either class A tracks or class B tracks. Each component half-track of a push-pull class A track is a complete record of the electrical impulses, but the two half-tracks are displaced 180° out of phase in relation to one another transversely of the film. A push-pull class B track, on the other hand, has one half-track which is a record of only the positive half-cycles of the electrical impulses, and another half-track which is a record of only their negative half-cycles, and these two records lie in mutually exclusive areas transversely of the film.

Since each class of push-pull tracks has its own advantages and disadvantages, it has been proposed to combine certain advantages, and to exclude certain disadvantages, by producing combination push-pull class A and class B tracks. In such push-pull class A—B tracks, the electrical impulses are recorded as class A tracks up to a certain degree of their intensity, and as class B tracks above that degree. This is done by providing the aforementioned screen of a mirror oscillograph recording optical system with a pair of openings which are alike, and which are shaped and positioned relative to one another substantially as follows:

Each opening is substantially triangular so as to have a tip, a base, and two straight edges which extend from the tip towards the base. The two openings are spaced apart horizontally, and oppositely disposed vertically in that their bases are turned away one from another, while their tips are located in approximately the same region of the screen. More exactly, the tip of one opening is on a line which traverses the other opening parallel to its base—thus dividing the two edges extending from its tip into two straight sections—and vice versa. At least one of the edges, furthermore, is shaped so that the section adjacent to the tip is inclined with respect to the base at an angle whose tangent is twice as large as the tangent of the angle formed by the other section and the base. The horizontal extension, or width, of each opening hence increases in linear proportion to its distance from the tip throughout the entire opening. But, while it increases at a certain rate until it reaches its value for the distance from the tip at which the above line is parallel to the base, it increases at twice that rate thereafter.

This duplication of the rate of change has been considered necessary for reasons which will be discussed hereinafter. For the present purpose of explaining the objects of the invention, it appears sufficient to state that the sudden break in the rate of change calls for an extremely accurate adjustment of the image of the openings with respect to the slit because even a slight maladjustment at this point would result in serious harmonic distortion of the impulse record produced on the moving film. The known method of producing push-pull class A—B tracks, and the known means for carrying it into effect, hence are very critical in their operation. The invention, therefore, is directed towards the provision of a method of, and means for, the production of push-pull class A—B tracks which are much less critical in their operation than the known method and means without, however, being inferior to them as regards the quality of the result.

On the contrary, the push-pull class A—B tracks produced by the method and means of the present invention are superior to the known tracks of this type in one important respect, namely, in that their inherent ground noise reduction is materially enhanced. It is well known in the art that pure push-pull class B tracks are inherently noiseless. This advantage is not fully preserved in the known push-pull class A—B tracks because electrical impulses of low intensity are recorded therein as pure class A tracks. The novel push-pull class A—B tracks are also pure class A tracks when the intensity of the electrical impulses is low, but they nevertheless have an inherent ground noise reduction which compares much more favorably with that of pure push-pull class B tracks than that of the push-pull class A—B tracks known heretofore.

It is, therefore, the primary object of the invention to provide an improved method of, and improved means for, producing push-call class A—B tracks.

Another object of the invention is the provision of such a method, and such means, which are not too critical in their operation.

Another object of the invention is the provision of such a method, and such means, which considerably lessen the danger of introducing harmonic distortion into the tracks produced thereby.

Another object of the invention is the provision of such means which afford a comfortable degree of tolerance in their adjustment.

Another object of the invention is the provision of improved push-pull class A—B tracks.

Another object of the invention is the provision of such tracks whose inherent ground noise reduction is materially enhanced.

Still other objects and advantages of the invention include those which are hereinafter stated or apparent, or which are incidental to the invention.

The objects of the invention are attained by employing, in lieu of the openings described hereinabove, two openings which are also substantially triangular and alike, but whose width continuously increases first in proportion to the square of, and then in linear proportion to, its distance from their tips. The rate of change of their width thus first continuously increases, and then remains constant at its maximum value. No sudden break, therefore, occurs in the rate of change which, on the contrary, has a smooth transition from a continuously increasing to a constant maximum value, and hence affords a comfortable degree of tolerance in the adjustment of the image of the openings with respect to the slit.

A width which increases as set forth in the preceding paragraph, is given to the openings according to the invention in the following manner: At least one of the two edges extending from the tip towards the base is made up of a section which is the segment of a parabola having its vertex at the tip and its axis parallel to the base, and a section which is the tangent to the first section at the point of junction of the two sections. The two openings, furthermore, are arranged so that the tip of one opening and the point, or points, of junction on the edge, or edges, of the other opening are on a line parallel to the two bases, and vice versa.

When such a pair of openings is provided in the aforementioned screen of a mirror oscillograph recording optical system, the moving film is exposed therein to two amounts of light flux which are continuously varied first in proportion to the square of, and then in linear proportion to, the intensity of the electrical impulses applied to the oscillograph galvanometer. The two amounts are, furthermore, varied 180° out of phase in relation to one another as long as they are varied in proportion to the square of the intensity, while one amount is constantly kept zero as long as the other amount is varied in linear proportion to the intensity, and vice versa. But the difference of the two amounts is always varied in linear proportion to the intensity.

The two amounts of light flux thus are varied in proportion to the square of the intensity when it is low. This condition brings it about that prints made of push-pull class A—B tracks produced by the method and means according to the invention have, for the rest position of the oscillograph mirror, a light transmission which is only half as great as the corresponding light transmission of prints made of the known push-pull class A—B tracks. A material reduction of ground noise hence is likewise effected by the invention.

It should be noted that the terms "vertical" and "horizontal" have been used in the foregoing brief description of the prior art and summary of the invention, and will be used throughout this specification, not in any absolute sense but merely as designating two directions at right angles to each other, and that choice between these terms has been determined solely by convenience in description and illustration.

The invention will be better understood when the following description is considered with the accompanying drawings of certain presently preferred embodiments thereof, and its scope will be pointed out in the appended claims.

Figure 10:
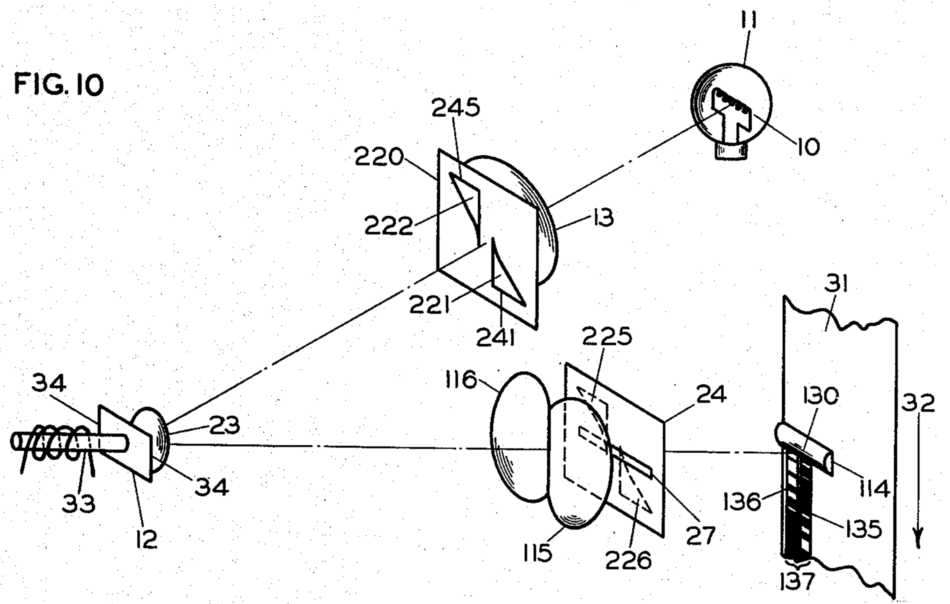
Figure 2:
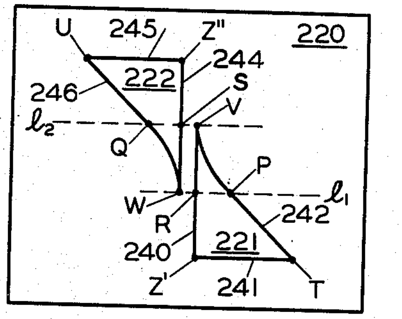
Fig. 2 is an enlarged elevation of a part of the optical system of Fig. 1, namely, a screen provided with a pair of openings according to the invention.
Figure 3:
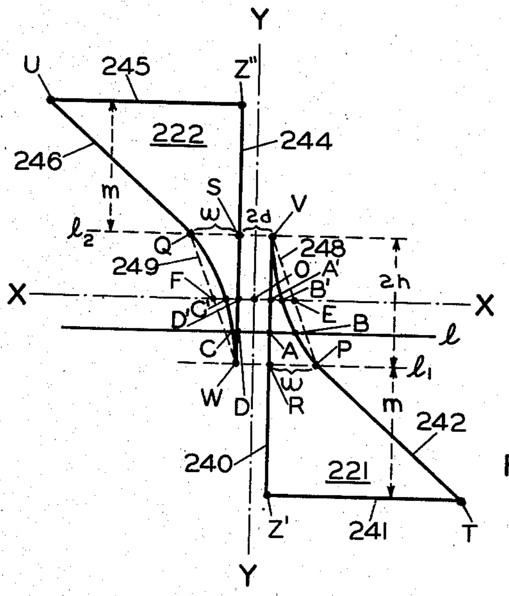
Figure 8:
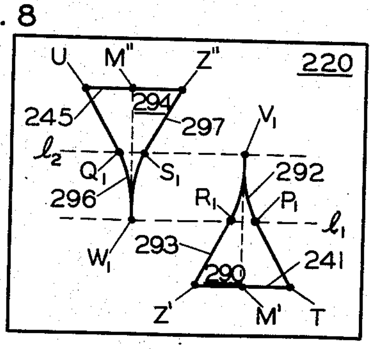
Figures 4, 9, 11:
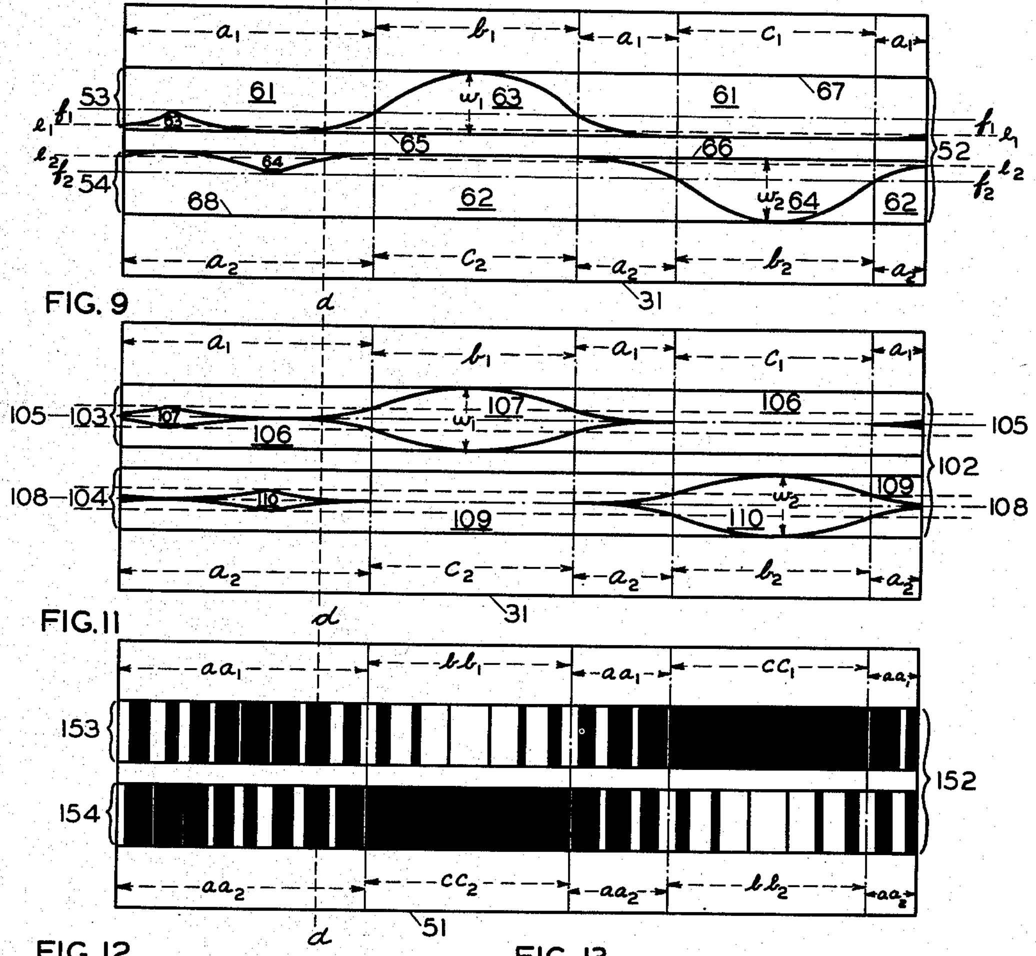
Figure 12:
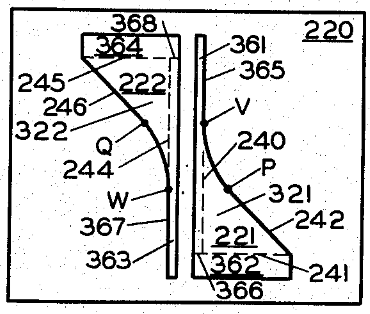
Figure 13:
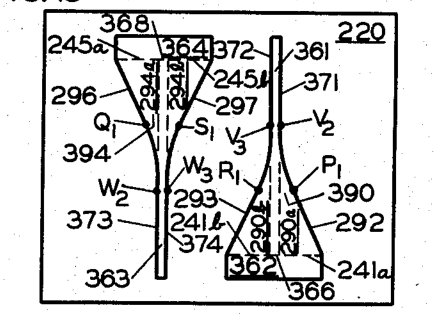

Fig. 3, which is drawn to twice the scale of Fig. 2, shows the openings of Fig. 2 related to a system of rectangular co-ordinates;

Fig. 4 is a diagrammatic representation of a push-pull class A—B variable area track produced by means of the openings of Fig. 2;

Figs. 5, 6, 7, and 8, show in enlarged elevation modifications of the openings which may be provided in the screen of Fig. 2;

Fig. 9 is a diagrammatic representation of a push-pull class A—B variable area track produced by means of the openings of Fig. 8;

Fig. 10 is a diagrammatic perspective view of a variable density recording optical system in which the invention has been embodied;

Fig. 11 is a diagrammatic representation of a print made of a push-pull class A—B variable density track produced with the optical system of Fig. 10 and any one of the pairs of openings shown in Figs. 2 and 5 to 8; and Figs. 12 and 13 show adaptations to a particular purpose of the openings of Figs. 2 and 8, respectively.

Figure 1:
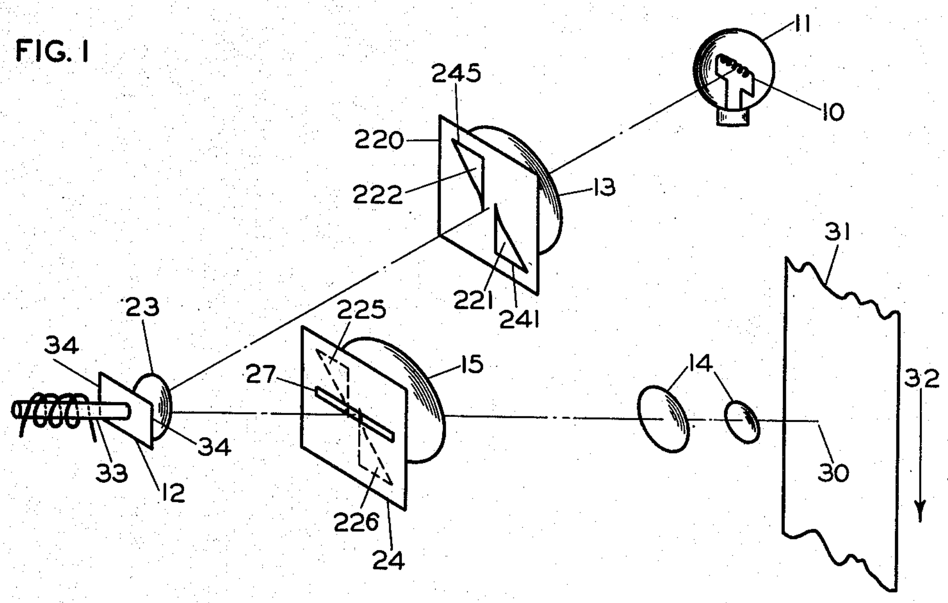
Fig. 1 is a diagrammatic perspective view of a variable area recording optical system in which the invention has been embodied.

Fig. 1 shows, by way of example, how the invention may be embodied in a conventional variable area recording optical system. The optical system of Fig. 1 has a suitable light source such as the filament 10 of an incandescent lamp 11. Lamp filament 10 is imaged substantially on the mirror 12 by the spherical condenser 13, and re-imaged substantially in the microscope objective 14 by the spherical lens 15.

A screen 220 is provided with a pair of openings 221 and 222, and placed adjacent to condenser lens 13 so that openings 221 and 222 are uniformly illuminated by light flux from lamp filament 10. Openings 221 and 222 are substantially triangular and alike, and each opening has a tip and a base. The two openings are spaced apart horizontally, and oppositely disposed vertically in that their tips are located in approximately the same region of screen 220, while their bases are turned away one from another. However, a more detailed description of the position of openings 221 and 222 relative to one another, and of their particular shape, will be given hereinafter.

A spherical lens 23 is placed in front of mirror 12 and forms on a screen 24 two images 225 and 226 of openings 221 and 222, respectively. Since openings 221 and 222 are uniformly illuminated, and since lens 23 is spherical, images 225 and 226 are two uniformly illuminated light spots which correspond in shape and relative position to openings 221 and 222.

Screen 24 is placed adjacent to lens 15 and provided with a horizontal slit 27 so that images 225 and 226 are formed in the plane of slit 27. Furthermore, mirror 12 is mounted for vibration on an oscillograph galvanometer 33, or a similar device for translating electrical impulses into mechanical vibrations. The axis 34—34 about which mirror 12 is adapted to vibrate, extends horizontally. When, therefore, the electrical impulses to be recorded are applied in known manner to the oscillograph 33, mirror 12 vibrates in accordance with their intensity and thereby moves images 225 and 226 vertically across slit 27.

Depending upon the degree of deflection of images 225 and 226 caused by a given angular position of mirror 12, one or two portions of slit 27 are illuminated by images 225 and 226. As seen from the recording point 30, therefore, there appears at slit 27 a horizontal line of light, or two such lines in juxtaposition, and these lines of light are reproduced at the recording point 30 by the microscope objective 14. Recording point 30 is the point at which the optical axis of the system strikes the film 31, and film 31 moves past the recording point 30 in a substantially vertical direction as indicated by the arrow 32.

The exact position of the two substantially triangular openings 221 and 222 relative to one another, as well as their particular shape, are shown in Figs. 2 and 3. Fig. 2 is an enlarged elevation of the screen 220 with the openings 221 and 222, and these openings are related to a system of rectangular co-ordinates X—X and Y—Y in Fig. 3, which figure is drawn to twice the scale of Fig. 2.

As will be seen from Figs. 2 and 3, opening 221 has two straight edges 240 and 241 which form a right angle at their common endpoint Z′, and an edge 242 opposite the right angle formed by edges 240 and 241. The common endpoint V of edges 240 and 242, furthermore, may be considered as the tip of opening 221, and edge 241 as its base. Correspondingly, opening 222 has two straight edges 244 and 245 which form a right angle at their common endpoint Z″, and an edge 246 opposite the right angle formed by edges 244 and 245. The common endpoint W of edges 244 and 246, furthermore, may be considered as the tip of opening 222, and edge 245 as its base. Edges 242 and 246, finally, are partly straight and partly curved, and the particular law of their contour will be explained presently.

Openings 221 and 222 are spaced apart horizontally so as to be separated by the distance $2d$, at which distance edges 240 and 244 are parallel to one another. The length of each edge 240 and 244 is $2h+m$, and the two edges are offset vertically so that they overlap only with their sections RV and WS whose length is $2h$. The endpoints Z′ and Z″ of edges 240 and 244, respectively, thus are turned away one from another, and so are the bases 241 and 245 of openings 221 and 222, respectively. Bases 241 and 245, in their turn, are also of equal length and parallel to one another at the distance $2(h+m)$, while they are offset horizontally by the distance $2d$.

A broken line $l_1$ traverses opening 221, intersects its edge 240 at the point R and passes through the tip W of opening 222. Correspondingly, a broken line $l_2$ traverses opening 222, intersects its edge 244 at the point S and passes through the tip V of opening 221. Lines $l_1$ and $l_2$ thus are perpendicular to edges 240 and 244, and parallel to one another as well as to the bases 241 and 245, the distance between lines $l_1$ and $l_2$ being $2h$ and the distance of line $l_1$ from base 241, and of line $l_2$ from base 245, being $m$.

Line $l_1$ intersects the edge 242 of opening 221 at the point P, and thereby divides edge 242 into the two sections VP and PT. Correspondingly, line $l_2$ intersects the edge 246 of opening 222 at the point Q, and thereby divides edge 246 into the two sections UQ and QW. However, while the sections PT and UQ of edges 242 and 246, respectively, are straight, their sections VP and QW are curved so as to be segments of two parabolae which are equal, but differently positioned. Section VP extends from the tip V of opening 221 towards its base 241 and is a segment of the parabola, opening to the right, which has its vertex at V, and its axis parallel to base 241 so that it coincides with line $l_2$. Section QW, on the other hand, extends from the tip W of opening 222 towards its base 245 and is a segment of the parabola, opening to the left, which has its vertex at W, and its axis parallel to base 245 so that it coincides with line $l_1$. Straight sections PT and and UQ, finally, are the tangents to the parabolic sections VP and QW, respectively, at the points of junction P and Q of the straight and parabolic sections.

Since edges 240 and 244 are the tangents at the vertices of two equal parabolae, since their sections RV and WS, respectively, are of the equal length $2h$, and since lines $l_1$ and $l_2$ are perpendicular to edges 240 and 244, respectively, the sections VP and QW of edges 242 and 246, respectively, are of equal length, and so are the segments RP and QS on lines $l_1$ and $l_2$, respectively; the length of these segments being $w$. Since, finally, the sections PT and UQ of edges 242 and 246, respectively, are also equal—as follows from elementary considerations—openings 221 and 222 are alike, and spaced apart horizontally and oppositely disposed vertically as has been explained hereinabove.

A specific property of openings 221 and 222 results from the fact that their edges 242 and 246, respectively, have the contour described hereinabove, and that the two openings themselves are positioned, relative to each other, as shown in Figs. 2 and 3 and likewise described hereinabove. This property shall now be explained with particular reference to Fig. 3 in which the openings 221 and 222 are related to a system of rectangular co-ordinates X—X and Y—Y. The system (X—X, Y—Y) is chosen so that, in relation to it, the co-ordinates of the endpoint Z′ of base 241 are $[+d, -(h+m)]$ and those of the endpoint Z″ of base 245 are $(-d, h+m)$. The co-ordinates of the tip V of opening 221 then are $(+d, +h)$, and those of the tip W of opening 222 are $(-d, -h)$. Section VP of edge 242, therefore, is a segment of the parabola whose equation is $$(1) \qquad k(y-h)^2=x-d$$

$k$ being a factor of proportionality whose choice determines the relation of the length $w$ of the segment RP on line $l_1$ to the length $2h$ of the section RV of edge 240. Since, furthermore, the straight section PT of edge 242 is the tangent to its parabolic section VP at the point P, it is a segment of the line whose equation is $$(2) \qquad -4khy=x-d$$

Similarly, section QW of edge 246 is a segment of the parabola whose equation is $$(3) \qquad k(y+h)^2=-(x+d)$$

and the straight section UQ of edge 246—which is the tangent to its parabolic section QW at the point Q—is a segment of the line whose equation is $$(4) \qquad 4khy=-(x+d)$$

Referring further to Fig. 3, a line $l$ is drawn so as to be parallel to lines $l_1$ and $l_2$ and simultaneously to traverse openings 221 and 222. Thus, a segment AB is determined on line $l$ by the sections RV and VJ of edges 240 and 242, respectively, and a segment CD by the sections QW and WS of edges 246 and 244, respectively. Assuming now that the term $y$ in Equations 1 to 4 denotes the distance of line $l$ from the axis X—X, it will be seen from Fig. 3 that, with respect to Equations 1 and 3, segment AB equals $x-d$, and segment CD equals $-(x+d)$, for the same value of $y$ as long as $y$ remains between $-h$ and $+h$ or, in other words, as long as line $l$ remains between lines $l_1$ and $l_2$—as shown in Fig. 3—or coincides with either line $l_1$ or line $l_2$.

When line $l$ coincides with line $l_1$ its segment CD is zero because line $l_1$ passes through the tip W of opening 222, while its segment AB is equal to the segment RP on line $l_1$. Since, furthermore, the point P is on section PT as well as on section VP, and since the distance of line $l_1$ from the axis X—X is $-h$, segment AB equals $x-d$ with respect to Equation 2 as well as Equation 1 when $y$ equals $-h$. In any position between line $l_1$ and base 241, finally, line $l$ traverses only opening 221 because the area of opening 222 does not extend beyond line $l_1$. Segment CD hence remains zero, while segment AB now—that is, for values of $y$ between $-h$ and $-(h+m)$—equals $x-d$ only with respect to Equation 2.

When line $l$ coincides with line $l_2$ its segment AB is zero because line $l_2$ passes through the tip V of opening 221, while its segment CD is equal to the segment QS on line $l_2$. Since, furthermore, the point Q is on section UQ as well as on section QW, and since the distance of line $l_2$ from the axis X—X is $+h$, segment CD equals $-(x+d)$ with respect to Equation 4 as well as Equation 3 when $y$ equals $+h$. In any position between line $l_2$ and base 245, finally, line $l$ traverses only opening 222 because the area of opening 221 does not extend beyond line $l_2$. Segment AB hence remains zero, while segment CD now—that is, for values of $y$ between $+h$ and $h+m$—equals $-(x+d)$ only with respect to Equation 4.

Segment AB thus is equal to $x-d$ with respect to Equation 1 for any value of $y$ between $+h$ and $-h$, and with respect to Equation 2 for any value of $y$ between $-h$ and $-(h+m)$. Its length, therefore, varies in proportion to the square of $y$ for values of $y$ between $+h$ and $-h$, and in linear proportion to $y$ for values of $y$ between $-h$ and $-(h+m)$. This variation is continuous since the straight section PT which is defined by Equation 2, is the tangent at the point P on the parabolic section VP which is defined by Equation 1. For values of $y$ between $+h$ and $h+m$, finally, the length of the segment AB is zero. Segment CD, in its turn, is equal to $-(x+d)$ with respect to Equation 3 for any value of $y$ between $-h$ and $+h$, and with respect to Equation 4 for any value of $y$ between $+h$ and $h+m$. Its length, therefore, varies in proportion to the square of $y$ for values of $y$ between $-h$ and $+h$, and in linear proportion to $y$ for values of $y$ between $+h$ and $h+m$. This variation is continuous since the straight section UQ which is defined by Equation 4, is the tangent at the point Q on the parabolic section QW which is defined by Equation 3. For values of $y$ between $-h$ and $-(h+m)$, finally, the length of the segment CD is zero.

In view of the foregoing explanations, it will be understood that the difference in length of the two segments AB and CD on line $l$ is related to different values of $y$ as follows:

For values of $y$ between $+h$ and $-h$, segment AB equals $x-d$ with respect to Equation 1, and segment CD equals $-(x+d)$ with respect to Equation 3. Within those limits of $y$, therefore, $$AB=k(y-h)^2$$

according to Equation 1, and $$CD=k(y+h)^2$$

according to Equation 3 so that $$(5) \qquad AB-CD=-4khy$$

For values of $y$ between $-h$ and $-(h+m)$, segment CD equals zero and segment AB equals $x-d$ with respect to Equation 2 so that $$AB-CD=AB=-4khy$$

For values of $y$ between $+h$ and $h+m$, finally, segment AB equals zero and segment CD equals $-(x+d)$ with respect to Equation 4 so that $$AB-CD=-CD=-4khy$$

Equation 5, therefore, holds for any value of $y$ between $-(h+m)$ and $h+m$ so that the difference in length of the two segments AB and CD is linearly related to the distance of line $l$ from the axis X—X for any position of line 1 between the bases 241 and 245. This fact bears upon the operation of the optical system of Fig. 1 as follows:

In that optical system, screen 220 is adjusted so that bases 241 and 245 of openings 221 and 222, respectively, extend horizontally, that is, in the same direction as mirror axis 34—34 and slit 27. When screen 220 is so adjusted, the line $l$ of Fig. 3 is the horizontal line through openings 221 and 222 which is conjugate to slit 27 with respect to spherical lens 23. The position of line $l$ between bases 241 and 245 then depends upon the angle of inclination of mirror 12, and mirror 12 is adjusted about its axis 34—34 so that at its rest or zero position—that is, when no electrical impulses are applied to the oscillograph 33—line $l$ is halfway between bases 241 and 245 so as to coincide with the axis X—X.

Moreover, since line $l$ is conjugate to slit 27 with respect to spherical lens 23, its segments AB and CD correspond to the two portions of slit 27 which are illuminated by the images 225 and 226 of openings 221 and 222, respectively; images 225 and 226 being formed in the plane of slit 27 by the spherical lens 23 as two uniformly illuminated light spots whose shape and relative position are those of openings 221 and 222. Segments AB and CD hence also correspond to the two horizontal lines of light as which the two illuminated portions of slit 27 are reproduced at the recording point 30 by the microscope objective 14.

The two lines of light at the recording point 30 vary in length in accordance with the deflection of images 225 and 226 with respect to slit 27, which deflection is caused by the vibration of mirror 12 about its axis 34—34. A certain deflection hence is indicated by a certain distance of line $l$ from the axis X—X—mirror 12 being adjusted as set forth hereinabove—while the length of the two lines of light for that deflection is indicated by the length of segments AB and CD for that distance. Equations 1 to 4, therefore, show how the individual lengths, and Equation 5 shows how the difference in length, of the two lines of light varies in relation to the deflection. The term $y$ in Equations 1 to 5 denotes the deflection; positive values of $y$ denoting deflection downwards, that is, in the direction indicated by the arrow 32 in Fig. 1, and negative values of $y$ denoting deflection upwards, that is, in the direction opposite to that indicated by the arrow 32. The right-hand members of Equations 1 to 4, on the other hand, denote the individual lengths of the two lines of light, while the right-hand member of Equation 5 denotes the difference of their lengths.

The length of the line of light which corresponds to the segment AB, thus continuously varies in proportion to the square of deflections between $+h$ and $-h$, and in linear proportion to deflections between $-h$ and $-(h+m)$; see Equations 1 and 2. For deflections, on the other hand, between $+h$ and $h+m$, the length of this line of light is zero—that is, the line of light is extinct—because those deflections shift the image 226 of opening 222 below the slit 27. Conversely, the length of the line of light which corresponds to the segment CD, continuously varies in proportion to the square of deflections between $-h$ and $+h$, and in linear proportion to deflections between $+h$ and $h+m$; see Equations 3 and 4. For deflections, on the other hand, between $-h$ and $-(h+m)$, the length of this line of light is zero because those deflections shift the image 225 of opening 221 above the slit 27.

For deflections between $+h$ and $-h$, therefore, the two lines of light both have a length which is greater than zero, and their lengths both vary in proportion to the square of the deflection, but in opposite senses so that, when one length increases, the other length decreases, and vice versa. The two lengths hence vary 180° out of phase in relation to one another for deflections between $+h$ and $-h$. For deflections between $-h$ and $-(h+m)$, furthermore, one length is constantly zero, while the other length varies in linear proportion to the deflection. The last mentioned length, finally, is constantly zero, and the other length varies in linear proportion to the deflection, for values thereof between $+h$ and $h+m$. But the difference of the two lengths is linearly related to the deflection for any value thereof between $-(h+m)$ and $h+m$; see Equation 5.

It is well understood in the art that the deflection of images 225 and 226 is linearly proportional to the intensity of the electrical impulses which are applied to the oscillograph 33, and that a given degree of the intensity causes maximum deflections of equal value in both directions. The two lengths, therefore, continuously vary first in proportion to the square of the intensity, and then in linear proportion to the intensity. They, furthermore, vary 180° out of phase in relation to one another as long as they vary in proportion to the square of the intensity, while one length is constantly zero as long as the other length varies in linear proportion to the intensity, and vice versa. But the difference of the two lengths always varies in linear proportion to the intensity. The value, finally, at which the variation of the two lengths changes its character, is their value for the deflections $-h$ and $+h$, respectively, and this value is equal for both lengths since $x-d=4kh^2$ for $y=-h$ according to Equation 1, and $$-(x+d)=4kh^2$$

for $y=+h$ according to Equation 3.

When now film 31 moves vertically past the recording point 30, there is produced thereon a photographic record of the electrical impulses which are applied to the oscillograph 33. This impulse record 52 is illustrated, by way of example, in Fig. 4 as being a record of two full cycles of a sine wave. The completion of the first cycle is indicated in Fig. 4 by the broken line $d$—$d$, and this cycle is recorded at an intensity which causes maximum deflections of $-h$ and $+h$, respectively. The second cycle, on the other hand, is recorded at an intensity which causes maximum deflections of $-(h+m)$ and $h+m$, respectively.

Since the two horizontal lines of light at the recording point 30 vary in length, the impulse record 52 is composed of the two variable area half-tracks 53 and 54 in juxtaposition. Each component half-track 53 and 54 has a transparent portion 61 and 62, respectively, and an opaque portion 63 and 64, respectively. Opaque portions 63 and 64 are the modulated portions of half-tracks 53 and 54, respectively, since it is their horizontal extension, or width, which varies in linear proportion to the variation in length of the two lines of light. Generally speaking, therefore, the individual widths $w_1$ and $w_2$ of opaque portions 63 and 64, respectively, and the difference of $w_1$ and $w_2$, vary in the same manner as the individual lengths of the two lines of light, and their difference in relation to the intensity of the electrical impulses which are applied to the oscillograph 33. More particularly, however, $w_1$ and $w_2$ vary as follows in the sections of opaque portions 63 and 64, respectively, which are designated in Fig. 4 by the letters $a_1$, $b_1$ and $c_1$, and $a_2$, $b_2$ and $c_2$, respectively:

In sections $c_1$ and $c_2$, respectively, $w_1$ and $w_2$ are constantly zero. This condition is due to the fact that the second cycle of the sine wave is recorded at an intensity which causes maximum deflections of $-(h+m)$ and $h+m$, respectively, and that the length of one line of light is constantly zero for deflections between $-h$ and $-(h+m)$, and the length of the other line of light is constantly zero for deflections between $+h$ and $h+m$. But the last mentioned length is greater than zero for deflections between $-h$ and $-(h+m)$, and the first mentioned length is greater than zero for deflections between $+h$ and $h+m$. Sections of portion 63 in which $w_1$ is constantly zero thus are accompanied transversely of film 31, by sections of portion 64 in which $w_2$ has a definite value, and vice versa.

The section $c_1$ of portion 63, for example, is accompanied by the section $b_2$ of portion 64, and the section $c_2$ of portion 64 by the section $b_1$ of portion 63. Sections $b_1$ and $b_2$, as well as sections $c_1$ and $c_2$, thus lie in mutually exclusive areas transversely of film 31, and $w_1$ and $w_2$ both have a definite value in sections $b_1$ and $b_2$, respectively. More particularly, $w_1$ and $w_2$ vary in these sections in linear proportion to the intensity; for the length of the one or the other line of light varies in linear proportion to the intensity when it causes deflections between $-h$ and $-(h+m)$ and $+h$ and $h+m$.

Aside from having concomitant sections such as sections $c_1$ and $b_2$, and sections $c_2$ and $b_1$, opaque portions 63 and 64 also have concomitant sections such as sections $a_1$ and $a_2$. In all sections $a_1$ and $a_2$, $w_1$ and $w_2$ both have a definite value and vary in proportion to the square of the intensity. But in any two concomitant sections $a_1$ and $a_2$, $w_2$ varies 180° out of phase in relation to the variation of $w_1$ so that, as long as $w_1$ increases, $w_2$ decreases, and vice versa. Concomitant sections such as sections $a_1$ and $a_2$ are present in portions 63 and 64 because the lengths of both lines of light vary 180° out of phase in relation to one another, and in proportion to the square of the intensity, when it causes deflections between $-h$ and $+h$.

In sections $c_1$ and $c_2$, therefore, $w_1$ and $w_2$ are constantly zero, while they are greater than zero in sections $a_1$ and $a_2$, and in sections $b_1$ and $b_2$. In sections $a_1$ and $a_2$, furthermore, $w_1$ and $w_2$ have values between zero and a certain value and vary in proportion to the square of the intensity, while they have values between that value and their maximum value, and vary in linear proportion to the intensity, in sections $b_1$ and $b_2$; the value at which the variation of $w_1$ and $w_2$ thus changes its character being their value for the deflections $-h$ and $+h$ respectively. Moreover, the variations of $w_1$ and $w_2$ is continuous in adjoining sections $a_1$ and $b_1$, and $a_2$ and $b_2$, because the lengths of the two lines of light continuously vary for deflections between $+h$ and $-(h+m)$, and between $-h$ and $h+m$, respectively. The difference of $w_1$ and $w_2$, finally, varies in any two concomitant sections $a_1$ and $a_2$, $b_1$ and $c_2$, and $c_1$ and $b_2$—that is, throughout the entire vertical extension, or length, of portions 63 and 64—always in linear proportion to the intensity as does the difference in length of the two lines of light at the recording point 30.

In view of the manner—shown in Fig. 4 and described hereinabove—in which the opaque portions 63 and 64 vary in width and are disposed in relation to one another, it will readily be understood by those skilled in the art that the impulse record 52 which is composed of the two half-tracks 53 and 54, is a push-pull class A—B variable area track. Up to a certain degree of their intensity—which degree causes deflections between $-h$ and $+h$—the electrical impulses are completely recorded in each half-track 53 and 54, and so that the two records are displaced 180° out of phase transversely of film 31. Above that degree, however, they are recorded in half-track 53 when they cause deflections in one direction, and in half-track 54 when they cause deflections in the opposite direction, and so that the two records lie in mutually exclusive areas transversely of film 31. But, in contradistinction to the push-pull class A—B variable area tracks of the prior art, the widths of the two modulated portions of half-tracks 53 and 54 continuously vary up to their value for the afore-mentioned degree of the intensity in proportion to its square, and above that value in linear proportion to the intensity. This novel feature yields, in two important respects, an improved result as will now be explained.

Referring to that end again to Fig. 3, it has been pointed out hereinabove that mirror 12 is adjusted so that, when it is at rest, line $l$ coincides with the axis X—X. When line $l$ has this position, its distance from axis X—X is zero and its segments AB and CD are equal to the segments A'B' and C'D', respectively, on axis X—X. Segments A'B' and C'D' are of equal length because, for $y=0$, $x-d=kh^2$ according to Equation 1 and $-(x+d)=kh^2$ according to Equation 3. The length of segments A'B' and C'D' is, furthermore, one quarter of the length $w$ of the segments RP and QS on lines $l_1$ and $l_2$, respectively, because $x-d=4kh^2$ for $y=-h$ according to Equation 1 and $-(x+d)=4kh^2$ for $y=+h$ according to Equation 3; $-h$ and $+h$ being the distances of lines $l_1$ and $l_2$, respectively, from axis X—X.

Referring further to Fig. 3, a broken line 248 is drawn from the tip V of opening 221 to the point P on its edge 242, and a broken line 249 from the tip W of opening 222 to the point Q on its edge 246; both lines 248 and 249 being straight. On axis X—X, therefore, there is determined the segment A'E by edge 240 and line 248, and the segment FD' by line 249 and edge 244. According to elementary geometry, the length of segments A'E and FD' is $w/2$, and hence twice the length $w/4$ of segments A'B' and C'D'.

Let it now be assumed that, in the optical system of Fig. 1, there is employed the screen 220 with the openings 221 and 222 and, alternatively, a screen with two straight-edged openings, and that the latter two openings correspond in shape and relative position to openings 221 and 222 except in so far as the parabolic sections VP and QW of edges 242 and 246, respectively, are replaced by straight sections corresponding to lines 248 and 249, respectively. Let it be further assumed that the images of the openings are subjected in both cases to maximum deflections of $-h$ in one direction, and $+h$ in the opposite direction. The maximum length of the two lines of light at the recording point 30 then is the same in both cases; for segments AB and CD are in either case equal to segments RP and QS, respectively, when $y$ equals $-h$ and $+h$, respectively. But their zero length—that is, their length for zero deflection, or for the rest position of mirror 12—is only half their above mentioned maximum length with the two straight-edged openings, while it is reduced to one quarter of that length with openings 221 and 222; for the length of segments A'E and FD' is $w/2$, while the length of segments A'B' and C'D' is $w/4$.

It will thus be seen that, for the deflections $-h$ and $+h$, respectively, $w_1$ and $w_2$ have the same value as the widths of the opaque portions of the two half-tracks produced on film 31 with the pair of straight-edged openings. But, for zero deflection, the latter widths have a value which is only half as large as the aforementioned value, while the value of $w_1$ and $w_2$ is reduced to one quarter of that value; the zero value of $w_1$ and $w_2$ being represented in Fig. 4 by the distance between the inner edge 65 of half-track 53 and the broken line $e_1$—$e_1$, and between the inner edge 66 of half-track 54 and the broken line $e_2$—$e_2$, respectively, and their value for the deflections $-h$ and $+h$, respectively, by the distance between edge 65 and the dot-and-dash line $f_1$—$f_1$, and between edge 66 and the dot-and-dash line $f_2$—$f_2$, respectively.

This difference in the proportion of the zero width to the width for the deflections $-h$ and $+h$, respectively, becomes important when sound is to be reproduced from prints made of the tracks produced on film 31. The ground noise originating from the print made of track 52 then amounts to only one half of the ground noise originating from the print of the track produced with the pair of straight-edged openings, which kind of openings have been conventionally employed for the production of push-pull class A—B tracks heretofore.

Fig. 3 furthermore shows that the straight line 248 is inclined with respect to the base 241 at an angle whose tangent is twice as large as the tangent of the angle formed by section PT and base 241. Within the opening which is bounded by edge 240, base 241, section PT and line 248, therefore, the length of the segment AB on line $l$ varies in linear relation to the distance of line $l$ from the tip V, but it varies for values of this distance between $2h$ and $2h+m$ twice as fast as for values thereof between zero and $2h$. Correspondingly, the straight line 249 is inclined with respect to the base 245 at an angle whose tangent is twice as large as the tangent of the angle formed by section UQ and base 245. Within the opening which is bounded by edges 244, base 245, section UQ and line 249, therefore, the length of the segment CD on line $l$ varies in linear relation to the distance of line $l$ from the tip W, but it varies for values of this distance between $2h$ and $2h+m$ twice as fast as for values thereof between zero and $2h$. This duplication of the rate of change has been considered necessary in order to compensate for the fact that, when the distance of line $l$ from the tips V and W is larger than $2h$, either segment CD or segment AB is zero. But the sudden break which thus occurs in the rate of change, makes the adjustment of the images of the two straight-edged openings a very critical one because even a slight inclination of the bases of the images with respect to slit 27 results in serious harmonic distortion of the impulse record on film 31.

In comparison, images 225 and 226 are much easier to adjust with respect to slit 27 because openings 221 and 222 are bounded by the edges 242 and 246 whose straight sections PT and UQ are the tangents at the points P and Q of their parabolic sections VP and QW, respectively. Within opening 221, therefore, the rate of change of the length of segment AB in relation to the distance of line $l$ from tip V continuously increases as this distance increases from zero to $2h$, and remains constant at its maximum value thereafter. Correspondingly, the rate of change of the length of segment CD in relation to the distance of line $l$ from tip W increases within opening 222 continuously as this distance increases from zero to $2h$, and remains constant at its maximum value thereafter. With openings 221 and 222, therefore, no sudden break occurs in the rate of change of the length of segments AB and CD and, consequently, of the length of the two lines of light at the recording point 30 and of the width of opaque portions 63 and 64. In spite of this smooth transition of the rate of change from a continuously increasing to a constant maximum value, full compensation is effected for the fact that, when the distance of line $l$ from the tips V and W is larger than $2h$, either segment CD or segment AB is zero. Why this compensation is obtained will be pointed out presently.

It will be understood by those skilled in the art that the print made of track 52 which has been mentioned hereinabove, is identical with track 52 except in so far as the portions on the print corresponding to portions 61 and 62 are opaque, and those corresponding to portions 63 and 64 are transparent. The modulated portions of the two component half-tracks on the print thus are transparent. In all other respects, however, the explanations made with reference to track 52 also apply to the track on the print. This track, furthermore, may be reproduced with a conventional push-pull reproducing system. Such a system essentially includes two photocells, one for each half-track, which generate voltages in a push-pull electrical circuit 180° out of phase. When the track on the print is so reproduced, a certain amount of light flux is transmitted by one of its transparent portions to one photocell, and another amount of light flux by the other transparent portion to the other photocell. These two amounts of light flux are linearly related to $w_1$ and $w_2$, respectively. Their difference hence is linearly related to the intensity of the electrical impulses recorded in track 52 since, as has been explained hereinabove, the difference $w_1-w_2$ is so related. Since, finally, the response of the entire reproducing system is equal to the difference in response of the two photocells—as is well known in the art—it, too, is linearly related to the intensity.

The electrical impulses applied to the oscillograph 33 and recorded on film 31 may thus be reproduced without distortion although the individual half-tracks of track 52, and of the track on the print, are distorted because $w_1$ and $w_2$ vary, in part, in proportion to the square of the intensity. Moreover, since the linear relation between the response of the reproducing system and the intensity is, for any degree thereof, given by Equation 5, the rate of change of the response is constant notwithstanding the fact that the individual responses of the two photocells each have a rate of change which continuously increases up to a constant maximum value.

Finally, it should be noted that a track identical with track 52 but having two modulated portions which are transparent, may be produced immediately on film 31 by adapting the optical system of Fig. 1 for recording in accordance with the reversal method.

The invention, and its objects and advantages, have been explained hereinabove with reference to the openings 221 and 222 which are shown in Figs. 1 to 3. However, openings 221 and 222 are not the only pair of openings by means of which the invention may be carried into effect. Other suitable pairs of openings are shown, by further way of example, in Figs. 5 to 8. The two openings constituting each of these four pairs are oppositely disposed vertically in the same manner as openings 221 and 222 and, like this pair of openings, employ the bases 241 and 245.

Bases 241 and 245 are in all cases parallel to one another at the distance $2(h+m)$, and offset with respect to each other by the distance $2d$. The openings of Figs. 5 to 8 can, therefore, be related to the system of rectangular co-ordinates X—X and Y—Y of Fig. 3 in the same manner as openings 221 and 222—namely, so that the co-ordinates of the endpoint Z' of base 241 are $[+d, -(h+m)]$ and those of the endpoint Z'' of base 245 are $(-d, h+m)$—and the following Equations 6 to 17 are written for such a relation. As in the case of openings 221 and 22, finally, the broken lines $l_1$ and $l_2$ are parallel to bases 241 and 245, and the distance of line $l_1$ from base 241, and of line $l_2$ from base 245, is again $m$ so that lines $l_1$ and $l_2$ are again parallel to one another at the distance $2h$.

Figure 5:
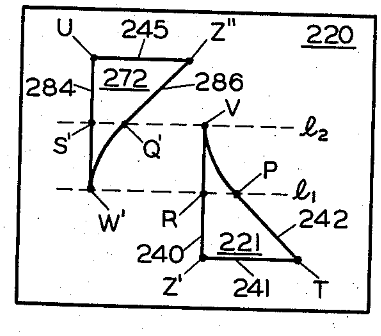
Figure 6:
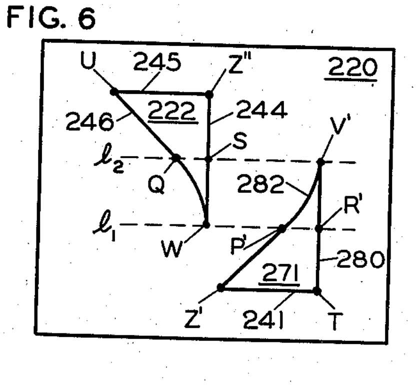

More particularly, the openings 221, 222, 271, and 272, of Figs. 2, 3, and 5 to 7, are all alike, but differently positioned. In Fig. 5, the opening 221 of Figs. 2 and 3 is paired with the opening 272, in Fig. 6 the opening 222 of Figs. 2 and 3 is paired with the opening 271, and in Fig. 7 the opening 271 of Fig. 6 is paired with the opening 272 of Fig. 5. The edge 286 of opening 272 is made up of the curved section W'Q' and the straight section Q'Z''. Section Q'Z'' is the tangent to section W'Q' at their point of junction Q' which is also the point of intersection of edge 286 and line $l_2$, and section W'Q' is a segment of the parabola, opening to the right, which has its vertex at the tip W' of opening 272 and its axis parallel to the base 245 thereof so that it coincides with line $l_1$. Section W'Q' thus is a segment of the parabola whose equation is (6) $$k(y+h)^2=x+4kh^2+4khm+d$$

and section Q'Z'' is a segment of the line whose equation is (7) $$4khy=x+4kh^2+4khm+d$$

The edge 282 of opening 271, on the other hand, is made up of the curved section P'V' and the straight section Z'P'. Section Z'P' is the tangent to section P'V' at their point of junction P' which is also the point of intersection of edge 282 and line $l_1$, and section P'V' is a segment of the parabola, opening to the left, which has its vertex at the tip V' of opening 271 and its axis parallel to the base 241 thereof so that it coincides with line $l_2$. Section P'V' thus is a segment of the parabola whose equation is (8) $$k(y-h)^2=-(x-4kh^2-4khm-d)$$

and section Z'P' is a segment of the line whose equation is (9) $$-4khy=-(x-4kh^2-4khm-d)$$

As indicated by the factor of proportionality $k$ in Equations 6 and 8, finally, the two parabolae defined by these equations are equal to one another as well as to the parabolae defined by Equations 1 and 3.

Figure 7:
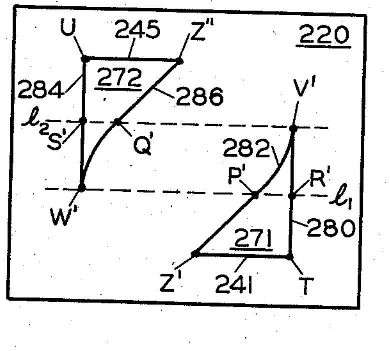

When, therefore, the openings of Figs. 5 to 7 are related to the system of co-ordinates X—X and Y—Y of Fig. 3 and the line $l$ again traverses the openings so that it is parallel to bases 241 and 245 and its segment AB is determined by the right-hand opening and its segment CD by the left-hand opening, segments AB and CD vary in relation to the distance $y$ of line $l$ from the axis X—X in the same manner as in the case of openings 221 and 222. In the case of openings 221 and 272 (Fig. 5), for example, segments AB and CD are equal to the right-hand member of Equations 1 and 6, respectively, for values of $y$ between $+h$ and $-h$. Hence, AB and CD both equal $kh^2$ for $y=0$, while $AB=4kh^2$ for $y=-h$ and $CD=4kh^2$ for $y=+h$; and, furthermore, again (5) $$AB-CD=-4khy$$

for values of $y$ between $+h$ and $-h$. Moreover, for values of $y$ between $-h$ and $-(h+m)$, segment CD again equals zero and segment AB again equals $x-d$ with respect to Equation 2 so that again $AB-CD=AB=-4khy$. Finally, for values of $y$ between $+h$ and $h+m$, segment AB again equals zero, while segment CD now equals $x+4kh^2+4khm+d$ with respect to Equation 7. The latter term, however, is equal to $4khy$ according to Equation 7 so that again $AB-CD=-CD=-4khy$.

Equation 5 thus holds again for any value of $y$ between $-(h+m)$ and $h+m$, and it will readily be understood by those skilled in the art that this is true also in the cases of openings 271 and 222 (Fig. 6), and of openings 271 and 272 (Fig. 7).

When the openings 221 and 272 of Fig. 5, the openings 271 and 222 of Fig. 6, or the openings 271 and 272 of Fig. 7, are in the screen 220 of the optical system of Fig. 1, screen 220 and mirror 12 are adjusted as in the case of openings 221 and 222. The optical system then operates as described hereinabove so that the explanations made as regards the variation in length of the two lines of light at the recording point 30 are valid also in each of the cases illustrated in Figs. 5 to 7. Moreover, the push-pull class A—B variable area track produced on film 31 by means of any one of the pairs of openings shown in Figs. 5 to 7 has, in general, the same appearance and characteristics as the track 52 shown in Fig. 4. In fact, the only difference between the tracks produced with the various pairs of openings resides in the relative positions of the straight boundaries of the opaque portions 63 and 64. In the case of openings 221 and 222, the straight boundaries of portions 63 and 64 coincide with the inner edges 65 and 66, respectively, of half-tracks 53 and 54, as illustrated in Fig. 4. With openings 221 and 272, the straight boundary of portion 63 retains its position, while that of portion 64 coincides with the outer edge 68 of half-track 54. With openings 222 and 271, the straight boundary of portion 64 has the position illustrated in Fig. 4, while that of portion 63 coincides with the outer edge 67 of half-track 53. With openings 271 and 272, finally the straight boundaries of portions 63 and 64 both coincide with the outer edges 67 and 68, respectively.

The openings of Figs. 2 and 5 to 7 all have a shape which is derived from a right triangle, and hence a straight edge such as the edge 240 of opening 221. For that reason, the two half-tracks produced by means of those openings have in each case a straight edge so that they are unilateral. But the push-pull class A—B track produced in accordance with the present invention may also be composed of two variable area half-tracks of the bilateral, or symmetrical, type. To achieve this end, there must be provided in the screen 220 of the optical system of Fig. 1 two openings whose shape is derived from an isosceles triangle, and which hence have each two edges shaped in accordance with the particular law set forth hereinabove.

Such a pair of openings are the openings 290 and 294 of Fig. 8 which are alike, but differently positioned. Openings 290 and 294 employ the bases 241 and 245, respectively, and the geometrical relationship of bases 241 and 245, and of the lines $l_1$ and $l_2$ with respect to bases 241 and 245, is the same as in all previous cases. Opening 290 is symmetrical with respect to the broken line M'V₁ which is perpendicular to the base 241 at its midpoint M'. Its edge 292 is made up of the curved section $V_1P_1$ and the straight section $P_1T$. Section $P_1T$ is the tangent to section $V_1P_1$ at their point of junction $P_1$ which is also the point of intersection of edge 292 and line $l_1$, and section $V_1P_1$ is a segment of the parabola, opening to the right, which has its vertex at the tip $V_1$ of opening 290 and its axis parallel to the base 241 thereof so that it coincides with line $l_2$. Section $V_1P_1$ thus is a segment of the parabola whose equation is $$\frac{k}{2}(y-h)^2=x-2kh^2-2khm-d \quad (10)$$

and section $P_1T$ is a segment of the line whose equation is $$-2khy=x-2kh^2-2khm-d \quad (11)$$

The edge 293 of opening 290, furthermore, is made up of the curved section $R_1V_1$ and the straight section $Z'R_1$. Section $Z'R_1$ is the tangent to section $R_1V_1$ at their point of junction $R_1$ which is also the point of intersection of edge 293 and line $l_1$, and section $R_1V_1$ is a segment of the parabola, opening to the left, which has its vertex at tip $V_1$ and its axis parallel to base 241 so that it coincides with line $l_2$. Section $R_1V_1$ thus is a segment of the parabola whose equation is $$\frac{k}{2}(y-h)^2=-(x-2kh^2-2khm-d) \quad (12)$$

and section $Z'R_1$ is a segment of the line whose equation is $$-2khy=-(x-2kh^2-2khm-d) \quad (13)$$

Opening 294, on the other hand, is symmetrical with respect to the broken line $W_1M''$ which is perpendicular to the base 245 at its midpoint M''. Its edge 296 is made up of the curved section $Q_1W_1$ and the straight section $UQ_1$. Section $UQ_1$ is the tangent to section $Q_1W_1$ at their point of junction $Q_1$ which is also the point of intersection of edge 296 and line $l_2$, and section $Q_1W_1$ is a segment of the parabola, opening to the left, which has its vertex at the tip $W_1$ of opening 294 and its axis parallel to the base 245 thereof so that it coincides with line $l_1$. Section $Q_1W_1$ thus is a segment of the parabola whose equation is $$\frac{k}{2}(y+h)^2=-(x+2kh^2+2khm+d) \quad (14)$$

and section $UQ_1$ is a segment of the line whose equation is $$2khy=-(x+2kh^2+2khm+d) \quad (15)$$

The edge 297 of opening 294, furthermore, is made up of the curved section $W_1S_1$ and the straight section $S_1Z''$. Section $S_1Z''$ is the tangent to section $W_1S_1$ at their point of junction $S_1$ which is also the point of intersection of edge 297 and line $l_2$, and section $W_1S_1$ is a segment of the parabola, opening to the right, which has its vertex at tip $W_1$ and its axis parallel to base 245 so that it coincides with line $l_1$. Section $W_1S_1$ thus is a segment of the parabola whose equation is $$\frac{k}{2}(y+h)^2=x+2kh^2+2khm+d \quad (16)$$

and section $S_1Z''$ is a segment of the line whose equation is $$2khy=x+2kh^2+2khm+d \quad (17)$$

As indicated by the factor of proportionality $k/2$ in Equations 10, 12, 14, and 16, finally, the four parabolae defined by these equations are equal.

When, therefore, the openings 290 and 294 are related to the system of co-ordinates X—X and Y—Y of Fig. 3 and the line $l$ again traverses them so that it is parallel to bases 241 and 245 and its segment AB is determined by the opening 290 and its segment CD by the opening 294, segments AB and CD vary in relation to the distance $y$ of line $l$ from the axis X—X in the same manner as in all previous cases. Segment AB is divided by the normal $M'V_1$ into two equal parts which are equal to the right-hand member of Equations 10 and 12, respectively, for values of $y$ between $+h$ and $-h$. Within this range of $y$, therefore, $$AB=\frac{k}{2}(y-h)^2+\frac{k}{2}(y-h)^2=k(y-h)^2$$

Segment CD, in its turn, is divided by the normal $W_1M''$ into two equal parts which are equal to the right-hand member of Equations 14 and 16, respectively, for values of $y$ between $+h$ and $-h$. Within this range of $y$, therefore, $$CD=\frac{k}{2}(y+h)^2+\frac{k}{2}(y+h)^2=k(y+h)^2$$

Hence, AB and CD both equal $kh^2$ for $y=0$, while $AB=4kh^2$ for $y=-h$ and $CD=4kh^2$ for $y=+h$; and, furthermore $$AB-CD=-4khy \quad (5)$$

for values of $y$ between $+h$ and $-h$. Moreover, for values of $y$ between $-h$ and $-(h+m)$, segment CD again equals zero, while the two parts of segment AB now equal the right-hand member of Equations 11 and 13, respectively, so that $AB=-2khy-2khy=-4khy$, and again $$AB-CD=AB=-4khy$$

Finally, for values of $y$ between $+h$ and $h+m$, segment AB again equals zero, while the two parts of segment CD now equal the right-hand member of Equations 15 and 17, respectively, so that $CD=2khy+2khy=4khy$, and again $$AB-CD=-CD=-4khy$$

Equation 5 thus holds again for any value of $y$ between $-(h+m)$ and $h+m$.

When the openings 290 and 294 of Fig. 8 are in the screen 220 of the optical system of Fig. 1, screen 220 and mirror 12 are adjusted as in the case of openings 221 and 222. The optical system then operates again as described hereinabove so that the explanations made as regards the variation in length of the two lines of light at the recording point 30 are valid also in the case of openings 290 and 294. The only difference is that the two lines of light vary in length at only one of their ends in the case of the openings of Figs. 2 and 5 to 7, while their length varies at both their ends in the case of openings 290 and 294. For that reason, the push-pull class A—B variable area track produced on film 31 by means of the openings 290 and 294 has the general appearance of the track 102 shown in Fig. 9. Like track 52, track 102 is illustrated, by way of example, as being a record of two full cycles of a sine wave; the completion of the first cycle being indicated again by the broken line $d$—$d$. The first cycle is recorded again at an intensity which causes maximum deflections of $-h$ and $+h$, respectively, and the second cycle is recorded again at an intensity which causes maximum deflections of $-(h+m)$ and $h+m$, respectively.

Since openings 290 and 294 are symmetrical with respect to the normals M'$V_1$ and $W_1$M'', respectively, the length of the two lines of light varies symmetrically at both their ends so that track 102 is composed of the two symmetrical variable area half-tracks 103 and 104. Half-track 103 is symmetrical about its vertical center line 105—105, and has a transparent portion 106 and an opaque portion 107. Correspondingly, half-track 104 is symmetrical about its vertical center line 108—108, and has a transparent portion 109 and an opaque portion 110. Opaque portions 107 and 110 are the modulated portions of half-tracks 103 and 104, respectively, since their widths $w_1$ and $w_2$, respectively, vary in linear proportion to the variation in length of the two lines of light.

It has been pointed out hereinabove that, in the case of openings 290 and 294, the segments AB and CD on line $l$ vary in relation to the distance of line $l$ from the axis X—X in the same manner as in the case of openings 221 and 222. The individual widths $w_1$ and $w_2$, and their difference, hence vary in the case of opaque portions 107 and 110 in the same manner as in the case of opaque portions 63 and 64 in relation to the intensity of the electrical impulses which are applied to the oscillograph 33. More particularly, therefore, opaque portions 107 and 110 have again sections $c_1$ and $c_2$, respectively, in which $w_1$ and $w_2$ are constantly zero, sections $a_1$ and $a_2$, respectively, in which $w_1$ and $w_2$ have values between zero and a certain value and vary in proportion to the square of the intensity, and sections $b_1$ and $b_2$, respectively, in which $w_1$ and $w_2$ have values between that value and their maximum value and vary in linear proportion to the intensity; the value at which the variation of $w_1$ and $w_2$ changes its character, being again their value for the deflections $-h$ and $+h$, respectively. Moreover, the variation of $w_1$ and $w_2$ is again continuous in adjoining sections $a_1$ and $b_1$, and $a_2$ and $b_2$, respectively, while again sections such as sections $a_1$ and $a_2$, sections such as sections $b_1$ and $c_2$, and sections such as sections $c_1$ and $b_2$, are concomitant; $w_1$ and $w_2$ varying again 180° out of phase in relation to one another in any two concomitant sections $a_1$ and $a_2$. Throughout the entire length of portions 107 and 110, finally, the difference of $w_1$ and $w_2$ again always varies in linear proportion to the intensity.

As in the case of opaque portions 63 and 64, furthermore, the zero value of $w_1$ and $w_2$ is one quarter of their value for the deflections $-h$ and $+h$, respectively, also in the case of opaque portions 107 and 110. The rate of change of $w_1$ and $w_2$, on the other hand, again has a smooth transition from a continuously increasing to a constant maximum value because the straight sections of the edges 292 and 293 of opening 290, and 296 and 297 of opening 294, are tangent to their parabolic sections, while the rate of change of the difference $w_1$—$w_2$ again is constant. Track 102 hence has the same advantages over the known push-pull class A—B tracks of the symmetrical type, as track 52 has over those of the unilateral type.

In view of the foregoing explanation of Figs. 2, 3, and 5 to 8, it will be understood by those skilled in the art that the segments AB and CD on line $l$ represents the horizontal extension, or width, of openings 221, 222, 271, 272, 290, and 294, respectively. Equations 1 and 2, 3 and 4, 6 and 7, 8 and 9, 10 to 13, and 14 to 17, hence show how the width of the openings varies in relation to its distance from their tips V, W, V', W', $V_1$ and $W_1$, respectively: It continuously increases first in proportion to the square of its distance from the respective tip—see Equations 1, 3, 6, 8, 10 and 12, and 14 and 16—and then in linear proportion to the distance—see Equations 2, 4, 7, 9 11 and 13, and 15 and 17; the value at which its increase thus changes its character, being its value for the distances $-h$ and $+h$, respectively. The rate of change of the width, furthermore, continuously increases until the width has reached the aforementioned value, and remains constant at its maximum value thereafter. Moreover, any two paired openings are substantially triangular and alike, and they are spaced apart horizontally and oppositely disposed vertically in such a manner that their widths vary 180° out of phase in relation to one another as long as they vary in proportion to the square of their distance from the respective tips, while one width is constantly zero as long as the other width varies in linear proportion to that distance, and vice versa. The difference of the two widths thus always varies at a constant rate of change in linear relation to the distance of both widths from either tip; see Equation 5.

Pairs of openings whose widths vary in the manner set forth in the preceding paragraph, have so far been shown and described as employed in conjunction with the variable area recording optical system of Fig. 1. They may be employed, however, also in certain variable density recording optical systems of the mirror oscillograph type, and Fig. 10 shows such an optical system by way of example. The optical system of Fig. 10 is made up mostly of the same parts as that of Fig. 1 so that parts common to the two optical systems are designated by the same reference characters. The two optical systems thus differ only in that the microscope objective 14 and the spherical lens 15 of the optical system of Fig. 1 are replaced in the optical system of Fig. 10 by a cylindrical lens 114 whose cylinder axis is horizontal, and a pair of beam-splitting spherical lenses 115 and 116, respectively.

Moreover, except for the employment of the screen 220 with the openings 221 and 222 in place of another screen with another pair of openings, the optical system of Fig. 10 is identical with the optical system shown in Figs. 11 to 14 of my Patent No. 2,404,137. Reference, therefore, is made to that patent, and also to my Patent No. 2,312,259, issued February 23, 1943, for a detailed explanation of the principle on which the optical system of Fig. 10 operates.

For the purpose of this specification, it thus is sufficient to state that at the recording point 130 of the optical system of Fig. 10 there are produced two horizontal lines of light in juxtaposition whose length is constant. But their illumination—that is, the amount of light flux per unit of their area—uniformly varies over their entire length in linear proportion to the variation in length of the two portions of the slit 27 which are illuminated by the images 225 and 226 of the openings 221 and 222. The variation in illumination of the two lines of light hence is related to the deflection of images 225 and 226 in the manner indicated by Equations 1 to 5. That is to say, the illumination of one line of light continuously varies in proportion to the square of deflections between $+h$ and $-h$, and in linear proportion to deflections between $-h$ and $-(h+m)$; see Equations 1 and 2. For deflections, on the other hand, between $+h$ and $h+m$ the illumination of this line of light is zero so that the line of light is extinct. Conversely, the illumination of the other line of light continuously varies in proportion to the square of deflections between $-h$ and $+h$, and in linear proportion to deflections between $+h$ and $h+m$—see Equations 3 and 4—while it is zero for deflections between $-h$ and $-(h+m)$.

The illumination of both lines of light thus is greater than zero for deflections between $+h$ and $-h$, and the individual illuminations both vary, within this range, in proportion to the square of the deflection, but 180° out of phase in relation to one another. For deflections between $-h$ and $-(h+m)$, furthermore, one illumination is constantly zero, while the other illumination varies in linear proportion to the deflection. The last mentioned illumination, finally, is constantly zero, and the other illumination varies in linear proportion to the deflection, for values thereof between $+h$ and $h+m$. But the difference of the two illuminations is linearly related to the deflection for any value thereof between $-(h+m)$ and $h+m$; see Equation 5. In relation to the intensity of the electrical impulses applied to the oscillograph 33, therefore, the illumination of the two lines of light at the recording point 130 varies in exactly the same manner as the length of the two lines of light at the recording point 30.

It will thus be seen that, when film 31 moves vertically past the recording point 130, there are produced thereon the two variable density half-tracks 135 and 136 in juxtaposition, and that half-tracks 135 and 136 are concomitant in such a manner as to constitute a push-pull class A—B variable density track 137. It will also be understood that the methods of producing the variable density track 137 and the variable area tracks 52 (Fig. 4) and 102 (Fig. 9) are alike in that they both involve the following steps:

At the recording points 30 (Fig. 1) and 130 (Fig. 10), respectively, there are produced in juxtaposition two horizontal lines of light which contain each a variable amount of light flux. These two amounts of light flux are continuously varied first in proportion to the square of, and then in linear proportion to, the intensity of the electrical impulses applied to the oscillograph 33. They, furthermore, are varied 180° out of phase in relation to one another as long as they are varied in proportion to the square of the intensity, while one amount is constantly kept zero as long as the other amount is varied in linear proportion to the intensity, and vice versa. But the difference of the two amounts is always varied in linear proportion to the intensity. The value, moreover, at which the variation of the two amounts changes its character, is their value for the deflections $-h$ and $+h$, respectively, and this value is made equal for both amounts. The variation, finally, of the two amounts of light flux is accomplished by varying either the length (in the optical system of Fig. 1), or the illumination (in the optical system of Fig. 10), of the two lines of light. Tracks 52 or 102 are obtained in the first case, and track 137 in the second case.

It is well known in the art that any kind of sensitive emulsion with which film 31 may be coated, responds linearly not to its exposure, but to the logarithm thereof. The variation in density of half-tracks 135 and 136 is, therefore, not linearly proportional to the variation in illumination of the two lines of light at the recording point 130. But, for making a print of track 137 there may be employed methods, generally known to those skilled in the art, by which the complete photographic process is controlled so that the light transmission of the print is linearly related to the exposure of film 31; this exposure being, in its turn, linearly proportional to the illumination of the two lines of light at the recording point 130.

A print obtained in this manner is illustrated, by way of example, in Fig. 11. This figure shows, printed on a film 51, a push-pull class A—B variable density track 152 which is composed of the two half-tracks 153 and 154 in juxtaposition. Like tracks 52 and 102, track 152 is illustrated, by way of example, as being a record of two full cycles of a sine wave; the completion of the first cycle being indicated again by the broken line $d—d$. The first cycle is recorded again at an intensity which causes maximum deflections of $-h$ and $+h$, respectively, and the second cycle is recorded again at an intensity which causes maximum deflections of $-(h+m)$ and $h+m$, respectively.

Since track 152 was obtained by the photographic methods referred to above, its light transmission is linearly proportional to the illumination of the two lines of light at the recording point 130. Generally speaking, therefore, the individual light transmissions of half-tracks 153 and 154, and their difference, vary in the same manner as the individual illuminations of the two lines of light, and their difference, in relation to the intensity of the electrical impulses which are applied to the oscillograph 33. That is to say, the two light transmissions continuously vary first in proportion to the square of, and then in linear proportion to, the intensity; the value at which their variation thus changes its character, being their value for the deflections $-h$ and $+h$, respectively. They, furthermore, vary 180° out of phase in relation to one another as long as they vary in proportion to the square of the intensity, while one light transmission is constantly zero as long as the other light transmission varies in linear proportion to the intensity, and vice versa, so that their difference always varies at a constant rate of change in linear proportion to the intensity.

More particularly, half-track 153 has sections $cc_1$ in which its light transmission is constantly zero, and half-track 154 has sections $cc_2$ in which its light transmission is constantly zero. Half-tracks 153 and 154, furthermore, have sections $aa_1$ and $aa_2$, respectively, in which their light transmission has values between zero and its value for the deflections $-h$ and $+h$, respectively, and varies in proportion to the square of the intensity. They, lastly, have sections $bb_1$ and $bb_2$, respectively, in which their light transmission has values between its last mentioned value and its maximum value and varies in linear proportion to the intensity. Moreover, the variation of the two light transmissions is continuous in adjoining sections $aa_1$ and $bb_1$, and $aa_2$ and $bb_2$, respectively, and sections such as sections $aa_1$ and $aa_2$, sections such as sections $bb_1$ and $cc_2$, and sections such as sections $cc_1$ and $bb_2$, are concomitant; the two light transmissions varying 180° out of phase in relation to one another in any two concomitant sections $aa_1$ and $aa_2$. Throughout the entire length of half-tracks 153 and 154, finally, the difference of the two light transmissions always varies in linear proportion to the intensity.

Track 152 may be reproduced with any conventional push-pull reproducing system such as has been briefly characterized hereinabove, and the reproduction of the electrical impulses recorded therein is undistorted for the reasons set forth hereinabove in connection with the description of track 52, and of the print made of track 52. Also, when sound is reproduced from track 152, a noticeable reduction of ground noise is effected. This result is obtained because, on account of the shape of openings 221 and 222, each half-track 153 and 154 has a light transmission whose zero value is one quarter its value for the deflections $-h$ and $+h$, respectively; the zero value of the light transmissions of half-tracks 153 and 154 being their value for the rest position of mirror 12. The employment, finally, of openings 221 and 222 has in the optical system of Fig. 10 the same advantage as regards the adjustment of their images 225 and 226 with respect to the slit 27 as in the optical system of Fig. 1.

In the place of openings 221 and 222 there may be employed in the optical system of Fig. 10 also the openings 221 and 272 of Fig. 5, the openings 222 and 271 of Fig. 6, the openings 271 and 272 of Fig. 7, or the openings 290 and 294 of Fig. 8. Substitution of any one of the pairs of openings shown in Figs. 5 to 8 for the openings 221 and 222, however, does in no case effect either the appearance, or the properties described hereinabove, of half-tracks 135 and 136, and 153 and 154; for in all cases there are produced at the recording point 130 two horizontal lines of light of constant length whose illumination uniformly varies in linear proportion to the variation in length of the two illuminated portions of slit 27.

In considering Fig. 11, finally, it must be borne in mind that the variation in light transmission of a variable density track can be illustrated only by a difference in its shading, and that it is well-nigh impossible properly to indicate, in a shading made by hand, the particular variation in light transmission which half-tracks 153 and 154 have in accordance with the present invention. Actually, the variation in light transmission of half-tracks 153 and 154 is the exact counterpart of the variation of $w_1$ and $w_2$, respectively, as diagrammatically illustrated in Figs. 4 and 9. Fig. 11 hence affords no more than a very crude likeness of the push-pull class A—B variable density track 152.

In an actual embodiment of the optical systems of Figs. 1 and 10, the dimensions of the images on the screen 24 may be different from those of the openings in the screen 220. Such enlargement or reduction, which depends upon the ratio of imagery chosen for the lens 23, does not affect the validity of the explanations made hereinabove, since it does not involve a change of proportion.

The openings in the screen 220, furthermore, are shown in Figs. 2 and 5 to 8 as having point-like tips V, W, V′, W′, $V_1$, and $W_1$, respectively, and linear bases 241 and 245, respectively. This simplified representation of the openings has been chosen in order to facilitate the explanation and understanding of the invention. In present day practice, however, it is customary to extend the tips of the openings so that they are rectangular rather than punctual, and to make the bases rectangular instead of linear. This well known expedient may easily be applied to the openings according to the invention by combining them with additional openings of a suitable shape in such a manner that the combined openings form a single opening whose contour is again substantially triangular. Two pairs of such combined openings are illustrated, by way of example, in Figs. 12 and 13.

Fig. 12 shows how, in order to obtain the desired result, opening 221 may be combined with the two rectangular openings 361 and 362, and opening 222 with the two rectangular openings 363 and 364, so as to form the two substantially triangular openings 321 and 322, respectively. Openings 361 and 363 are equal, and so are openings 362 and 364. Openings 221, 361, and 362, are arranged so that one of the vertical edges of opening 361 coincides with the vertical edge 240 of opening 221. Since, however, this edge of opening 361 is longer than edge 240, its section 365 extends beyond the tip V of opening 221 so as to be the tangent at the vertex of the parabolic section VP of edge 252. One of the horizontal edges of opening 362, on the other hand, coincides with the base 241 of opening 221, and with the horizontal edge 366 of opening 361.

Correspondingly, openings 222, 363, and 364, are arranged so that one of the vertical edges of opening 363 coincides with the vertical edge 244 of opening 222. Since, however, this edge of opening 363 is longer than edge 244, its section 367 extends beyond the tip W of opening 222 so as to be the tangent at the vertex of the parabolic section QW of edge 246. One of the horizontal edges of opening 364, on the other hand, coincides with the base 245 of opening 222, and with the horizontal edge 368 of opening 363.

In Fig. 13, opening 290 is combined with the openings 361 and 362, and opening 294 with the openings 363 and 364, so as to form the two substantially triangular openings 390 and 394, respectively. Openings 290, 361, and 362, are arranged so that opening 361 bisects opening 290. Opening 290 is thereby divided into the equal portions 290*a* and 290*b* with bases 241*a* and 241*b* and tips $V_2$ and $V_3$, respectively. The sections 371 and 372 of the vertical edges of opening 361, furthermore, extend beyond the tips $V_2$ and $V_3$, respectively, so as to be the tangents at the vertices of the parabolic sections $V_2P_1$ of edge 292 and $R_1V_3$ of edge 293, respectively. Opening 362, on the other hand, has a horizontal edge which coincides with bases 241*a* and 241*b*, and with the horizontal edge 366 of opening 361.

Correspondingly, openings 294, 363, and 364, are arranged so that opening 363 bisects opening 294. Opening 294 is thereby divided into the equal portions 294*a* and 294*b* with bases 245*a* and 245*b* and tips $W_2$ and $W_3$, respectively. The sections 373 and 374 of the vertical edges of opening 363, furthermore, extend beyond the tips $W_2$ and $W_3$, respectively, so as to be the tangents at the vertices of the parabolic sections $Q_1W_2$ of edge 296 and $W_3S_1$ of edge 297, respectively. Opening 364, on the other hand, has a horizontal edge which coincides with bases 245*a* and 245*b*, and with the horizontal edge 368 of opening 363.

With openings such as the openings 221 and 222 of Fig. 2, or 290 and 294 of Fig. 8, their total width is utilized for varying the two amounts of light flux passing through the slit 27 of the optical systems of Figs. 1 and 10 so that their total width is also their effective width. With openings such as the openings 321 and 322 of Fig. 12, or 390 and 394 of Fig. 13, on the other hand, that part of their width which is equal to the horizontal extension, or width, of openings 361 and 363, respectively, does not effect a variation of the light flux since it is constant. The effective width of the latter openings hence is the difference between their total width and the width of openings 361 and 363, respectively, so that it is equal to the total width of the former openings.

But, although it has a different value, the total width of the openings shown in Figs. 12 and 13—like that of the openings shown in Figs. 2 and 5 to 8—continuously increases first in proportion to the square of, and then in linear proportion to, its distance from the tip; it being understood that, in cases such as those illustrated in Figs. 12 and 13, the tip is rectangular rather than punctual as it is in cases such as those illustrated in Figs. 2 and 5 to 8. When, therefore, openings such as openings 321 and 322, or 390 and 394, are in the screen 220 of the optical systems of Figs. 1 and 10, the two amounts of light flux at the recording points 30 and 130, respectively, again continuously vary first in proportion to the square of, and then in linear proportion to, the intensity of the electrical impulses.

Considering their total width, openings such as openings 321 and 322 thus distinguish from openings such as openings 221 and 222 in that the total width of the latter openings is zero when it is constant, while the width of the former openings is greater than zero when it is constant. The variable area track produced with the former openings consequently distinguishes from track 52 in that the width of the modulated portions of its half-tracks is greater than zero in the sections corresponding to sections $c_1$ and $c_2$, respectively, that is, in the sections in which it is constant. Correspondingly, the variable density track produced with openings such as openings 321 and 322 distinguishes from track 152 in that the light transmission of its half-tracks is greater than zero in the sections corresponding to sections $cc_1$ and $cc_2$, respectively. Finally, it should be noted that the terms "width" and "light transmission" are used in the appended claims as denoting the total width of an opening or a variable area track, and the total light transmission of a variable density track.

As will be seen from Figs. 2, 5 to 8, 12 and 13, and particularly from Fig. 3, the openings shown in these figures have been dimensioned so that $m$ equals $2h$. This has been done merely for the sake of simplicity and clearness in illustration, while in an actual embodiment of the invention any proportion between $m$ and $2h$ may be chosen which is thought desirable for obtaining the best results in the particular case. That the invention may be carried into effect with any such proportion follows from the fact that Equations 1 to 4 and 6 to 17 are not based upon a particular proportion between $m$ and $2h$. For any chosen proportion of $m$ and $2h$, finally, a pair of openings according to the invention will afford the advantages set forth hereinabove in comparison to a pair of conventional straight-edged openings having the same proportion between $m$ and $2h$, and also the same proportion between the length $w$ of the segments RP and QS, and the length of the bases 241 and 245.

Having thus described several embodiments of my invention, I wish to point out that it is not limited to the specific structures shown, but is of the scope of the appended claims.

What I claim is:

1. A photographic record of electrical impulses on a film, said electrical impulses having an intensity and said record being composed of two variable area half-tracks in juxtaposition: one of said half-tracks having a modulated portion which is of a first width, and the other half-track having a modulated portion which is of a second width; said first and second widths continuously varying first in proportion to the square of said intensity, and then in linear proportion to said intensity; said first and second widths varying 180° out of phase in relation to one another as long as they vary in proportion to the square of said intensity; said first width being constant as long as said second width varies in linear proportion to said intensity, and said second width being constant as long as said first width varies in linear proportion to said intensity; and the difference of said first and second widths always varying in linear proportion to said intensity.

2. A photographic record of electrical impulses on a film, said electrical impulses having an intensity and said record being composed of two variable area half-tracks in juxtaposition: one of said half-tracks having a first modulated portion, and the other half-track having a second modulated portion; said first modulated portion having a first width and having first, second and third sections, and said second modulated portion having a second width and having fourth, fifth and sixth sections; said first width varying in proportion to the square of said intensity in said first sections and in linear proportion to said intensity in said second sections, and being constant in said third sections; said second width varying in proportion to the square of said intensity in said fourth sections and in linear proportion to said intensity in said fifth sections, and being constant in said sixth sections; said first width continuously varying in adjoining first and second sections, and said second width continuously varying in adjoining fourth and fifth sections; said first and fourth sections being concomitant, and said first width varying in said first sections 180° out of phase in relation to the variation of said second width in said fourth sections; said second and sixth sections, and said third and fifth sections, being concomitant; and the difference of said first and second widths always varying in linear proportion to said intensity.

3. The photographic record defined in claim 2, and wherein said first width is zero in said third sections, and said second width is zero in said sixth sections.

4. The photographic record defined in claim 2, and wherein said first width is greater than zero in said third sections, and said second width is greater than zero in said sixth sections.

5. The photographic record defined in claim 2, and wherein said first and second modulated portions are opaque.

6. The photographic record defined in claim 2, and wherein said first and second modulated portions are transparent.

7. A photographic record of electrical impulses on a film, said electrical impulses having an intensity and said record being composed of two variable density half-tracks in juxtaposition: one of said half-tracks having a first light transmission, and the other half-track having a second light transmission; said first and second light transmissions continuously varying first in proportion to the square of said intensity, and then in linear proportion to said intensity; said first and second light transmissions varying 180° out of phase in relation to one another as long as they vary in proportion to the square of said intensity; said first light transmission being constant as long as said second light transmission varies in linear proportion to said intensity, and said second light transmission being constant as long as said first light transmission varies in linear proportion to said intensity; and the difference of said first and second light transmissions always varying in linear proportion to said intensity.

8. A photographic record of electrical impulses on a film, said electrical impulses having an intensity and said record being composed of two variable density half-tracks in juxtaposition: one of said half-tracks having a first light transmission and consisting of first, second and third sections, and the other half-track having a second light transmission and consisting of fourth, fifth and sixth sections; said first light transmission varying in proportion to the square of said intensity in said first sections and in linear proportion to said intensity in said second section, and being constant in said third sections; said second light transmission varying in proportion to the square of said intensity in said fourth sections and in linear proportion to said intensity in said fifth sections, and being constant in said sixth sections; said first light transmission continuously varying in adjoining first and second sections, and said second light transmission continuously varying in adjoining fourth and fifth sections; said first and fourth sections being concomitant, and said first light transmission varying in said first sections 180° out of phase in relation to the variation of said second light transmission in said fourth sections; said second and sixth sections, and said third and fifth sections, being concomitant; and the difference of said first and second light transmissions always varying in linear proportion to said intensity.

9. The photographic record defined in claim 8, and wherein said first light transmission is zero in said third sections, and said second light transmission is zero in said sixth sections.

10. The photographic record defined in claim 8, and wherein said first light transmission is greater than zero in said third sections, and said second light transmission is greater than zero in said sixth sections.

11. A photographic record of electrical impulses on a film, said electrical impulses having an intensity and said record being composed of two half-tracks in juxtaposition: one of said half-tracks having a first light transmission, and the other half-track having a second light transmission; said first and second light transmissions continuously varying first in proportion to the square of said intensity, and then in linear proportion to said intensity; said first and second light transmissions varying 180° out of phase in relation to one another as long as they vary in proportion to the square of said intensity; said first light transmission being constant as long as said second light transmission varies in linear proportion to said intensity, and said second light transmission being constant as long as said first light transmission varies in linear proportion to said intensity; and the difference of said first and second light transmissions always varying in linear proportion to said intensity.

12. In an optical system, a screen having two openings which are substantially triangular and alike; one of said openings having a first tip and a first width, and the other opening having a second tip and a second width; said first width continuously increasing first in proportion to the square of its distance from said first tip, and then in linear proportion to said distance; said second width continuously increasing first in proportion to the square of its distance from said second tip, and then in linear proportion to said last mentioned distance; and said two openings being spaced apart horizontally and oppositely disposed vertically so that said first and second widths vary 180° out of phase in relation to one another as long as they vary in proportion to the square of said distances, said first width is constant as long as said second width varies in linear proportion to its distance from said second tip and said second width is constant as long as said first width varies in linear proportion to its distance from said first tip, and the difference of said first and second widths always varies in linear relation to their distance from either of said tips.

13. The combination defined in claim 12, and wherein said first and second widths are zero when they are constant.

14. The combination defined in claim 12, and wherein said first and second widths are greater than zero when they are constant.

15. In an optical system, a screen having two openings which are substantially triangular and alike; each of said openings having a tip, a base, and an edge which extends from said tip towards said base; said edge having a first section and a second section: said first section being the segment of a parabola which has its vertex at said tip and its axis parallel to said base, and said second section being the tangent to said first section at the point of junction of said first and second sections; and said two openings being spaced apart horizontally and oppositely disposed vertically.

16. In an optical system, a screen having two openings which are substantially triangular and alike; one of said openings having a first tip, a first base, and a first edge which extends from said first tip towards said first base, and the other opening having a second tip, a second base, and a second edge which extends from said second tip towards said second base; said first edge having a first section and a second section: said first section being the segment of a parabola which has its vertex at said first tip and its axis parallel to said first base, and said second section being the tangent to said first section at the point of junction of said first and second sections; said second edge having a third section and a fourth section: said third section being the segment of a parabola which has its vertex at said second tip and its axis parallel to said second base, and said fourth section being the tangent to said third section at the point of junction of said third and fourth sections; said first and second bases being parallel to one another; and said last mentioned point of junction and said first tip being on a first line parallel to said first and second bases, said first mentioned point of junction and said second tip being on a second line parallel to said first and second bases, and the distance of said first line from said second base and the distance of said second line from said first base being equal.

17. In an optical system, a screen having two openings which are alike and spaced apart horizontally; one of said openings having a first edge, a second edge and a third edge, and the other opening having a fourth edge, a fifth edge and a sixth edge; said first and second edges being straight and forming a first right angle, and said third edge being opposite said first right angle and having a first section and a second section: said first section being the segment of a parabola which has its vertex on said first edge and its axis parallel to said second edge, said first edge being the tangent at said vertex, and said second section being the tangent to said first section at the point of junction of said first and second sections; said fourth and fifth edges being straight and forming a second right angle, and said sixth edge being opposite said second right angle and having a third section and a fourth section: said third section being the segment of a parabola which has its vertex on said fourth edge and its axis parallel to said fifth edge, said fourth edge being the tangent at said last mentioned vertex, and said fourth section being the tangent to said third section at the point of junction of said third and fourth sections; said second and fifth edges being parallel to one another; and said last mentioned point of junction and said first mentioned vertex being on a first line parallel to said second and fifth edges, said first mentioned point of junction and said last mentioned vertex being on a second line parallel to said second and fifth edges, and the distance of said first line from said fifth edge and the distance of said second line from said second edge being equal.

18. In an optical system, a screen having two openings which are substantially triangular and alike; one of said openings having a first tip, a first base, a first edge and a second edge, and the other opening having a second tip, a second base, a third edge and a fourth edge; said first and second edges extending from said first tip towards said first base, said first edge having a first section and a second section, and said second edge having a third section and a fourth section: said first and third sections being the segments of two parabolae opening in opposite directions and having their vertices at said first tip and their axes parallel to said first base, said second section being the tangent to said first section at the point of junction of said first and second sections, and said fourth section being the tangent to said third section at the point of junction of said third and fourth sections; said third and fourth edges extending from said second tip towards said second base, said third edge having a fifth section and a sixth section, and said fourth edge having a seventh section and an eighth section: said fifth and seventh sections being the segments of two parabolae opening in opposite directions and having their vertices at said second tip and their axes parallel to said second base, said sixth section being the tangent to said fifth section at the point of junction of said fifth and sixth sections, and said eighth section being the tangent to said seventh section at the point of junction of said seventh and eighth sections; said first and second bases being parallel to one another; and said two last mentioned points of junction and said first tip being on a first line parallel to said first and second bases, said two first mentioned points of junction and said second tip being on a second line parallel to said first and second bases, and the distance of said first line from said second base and the distance of said second line from said first base being equal.

JOHN A. MAURER, Jr.

REFERENCES CITED

The following references are of record in the file of this patent:

UNITED STATES PATENTS

| Number | Name | Date |
|---|---|---|
| 1,767,790 | Gerlach | June 24, 1930 |
| 2,217,154 | Cartwright | Oct. 8, 1940 |
| 2,284,731 | Goshaw | June 2, 1942 |
| 2,404,137 | Maurer | July 16, 1946 |